Oct. 24, 1933.   E. J. R. BEATTEY   1,932,261
CONSTRUCTION OF OPHTHALMIC MOUNTINGS
Filed Jan. 21, 1930
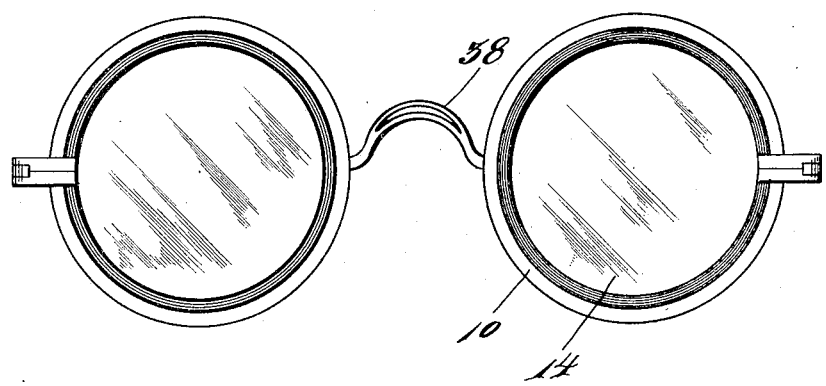
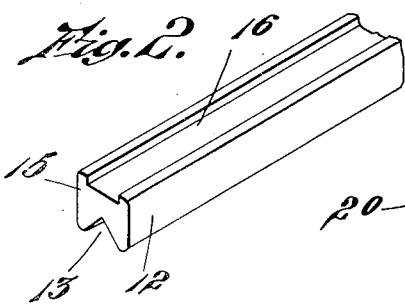
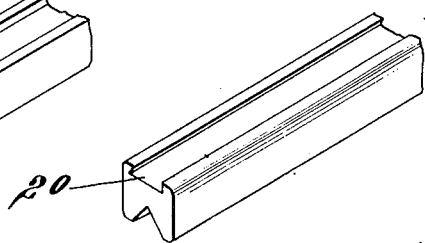
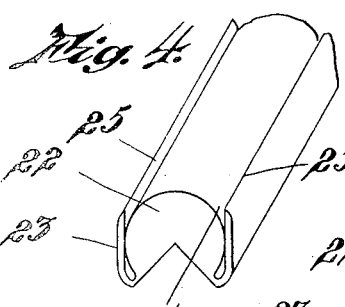
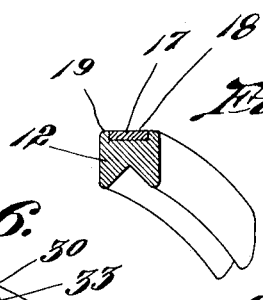
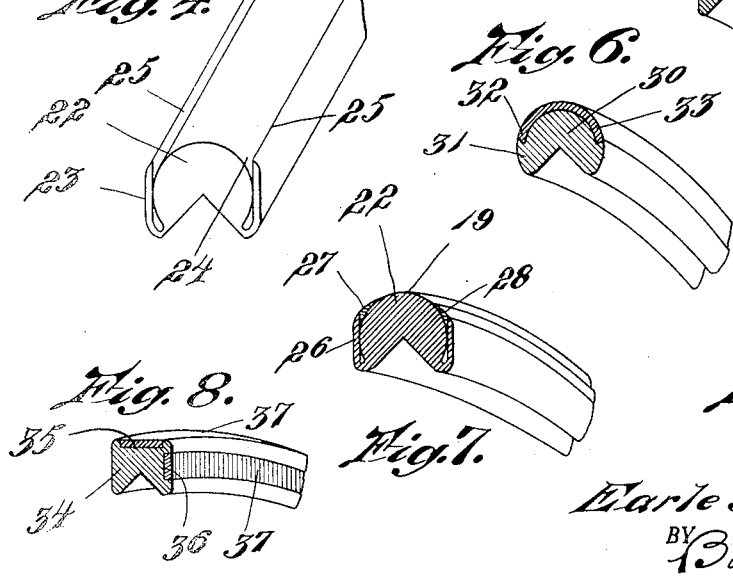
INVENTOR.
Earle J. R. Beattey.
BY Barlow & Barlow
ATTORNEYS.

Patented Oct. 24, 1933

1,932,261

UNITED STATES PATENT OFFICE 1,932,261

CONSTRUCTION OF OPHTHALMIC MOUNTINGS

Earle J. R. Beattey, Edgewood, R. I., assignor to Universal Optical Corporation, Providence, R. I., a corporation of Rhode Island Application January 21, 1930. Serial No. 422,323

5 Claims. (Cl. 88—47)

This invention relates to an improvement in the construction of ophthalmic mountings; and has for its object to provide a metallic eyewire or bridge or both with a portion of its outer surface covered or inlaid with a non-metallic material.

A further object of the invention is the provision of outwardly extending portions from the outer surface of the eyewire or bridge to form a recess or groove in which groove or between which outwardly extending portions nonmetallic material may be positioned with the surface of the non-metallic material substantially flush with the bordering metallic surface at either side along the lens frame when finished.

A further object of the invention is the provision of a lens frame or bridge which will have a so-called two-tone effect formed by different materials being visible from its outer surface.

With these and other objects in view, the invention consists of certain novel features of construction, as will be more fully described, and particularly pointed out in the appended claims.

In the accompanying drawing:

Figure 1 is a front view of a spectacle frame constructed as illustrated herein.

Figure 2 is a perspective view of the eyewire grooved for the reception of non-metallic material.

Figure 3 is a view similar to Figure 2 with the edges of the groove or recess undercut.

Figure 4 is a perspective view of a modified construction showing the eyewire as formed with laterally-extending flanges which are bent up to form a recess for the reception of non-metallic material.

Figure 5 is a perspective view of a portion of the wire in Figure 2 having non-metallic or enamel material positioned therein.

Figure 6 is a perspective view showing a further modification with the eye wire formed with a wide groove.

Figure 7 is a perspective view of a still further modification showing a construction similar to that illustrated in Figure 4 with narrower flanges bent up so as to form spaced recesses for the reception of non-metallic material.

Figure 8 illustrates a still further modification showing the recesses formed on both the front and side of the metallic eyewire with the nonmetallic material in said recesses.

Figure 9 is a section through the bridge showing the same as having enamel inset thereinto in a recess.

Figure 10 is a view similar to Figure 9 of a modified form of bridge.

In the use of ophthalmic mountings, for many purposes it is found desirable to provide a metallic eyewire for encircling the lenses and in order to ornament the eyewire or bridge and in some instances to prevent contact of the wire with the flesh of the wearer, I have inlaid enamel or suitable non-metallic material in the eyewire or bridge along its edge and front face which will produce a stripe forming a two-tone effect which is attractive in appearance; and the following is a detailed description of the present embodiment of this invention illustrating the preferred means by which these advantageous results may be accomplished.

With reference to the drawing, 10 designates the lens rim having a metallic wire 12 with a V-shaped groove 13 on its inner surface to receive the eyeglass 14 therein. The outer surface of this wire is provided with a pair of projecting portions 15 leaving a recess 16 between them for the reception of non-metallic material such as enamel 17 and the like which may be packed thereinto, baked and then polished off so that its outer surface 10 is substantially flush with the outer surface 19 of the wire or the enamel may be inlaid therein on a plastic conditioned and hardened with a surface slightly below the edges of the groove.

In some instances, I may undercut the projecting portions 15 enlarging the recess between the edges 15 for the reception and locking in position of the enamel material, as desired.

In Figure 4 the wire 22 is shown as provided with flanges 23 folded back against the sides of the wire each flange being of a dimension greater than the thickness of the wire to form a space or recess 24 between its edges 25 to receive and hold enamel material in position.

In some cases the wire 22 is provided with flanges 26 shorter than the flange 23 illustrated in Figure 4, which flanges extend but a portion of the thickness of the wire leaving two spaced narrower recesses for the reception of the nonmetallic material 27 and 28, spaced apart by the outer surface 29 of the wire which produce a pair of spaced stripes of the non-metallic material along the outer surface of the wire.

In other cases instead of forming the flanges as illustrated in Figures 4 and 7 and bending them into position illustrated therein, a wire 30 may be formed with projections 31 having undercut shoulders 32 to receive between these shoulders non-metallic material 33 spanning a large portion of the outer surface of the wire which may also serve to prevent contact of the wire with the flesh of the user.

In still other cases a wire 34 may be formed with a groove 35 on its edge and a groove 36 on its front face to be filled with non-metallic or enamel material 37, whereby the stripe effect will be visible when viewed either from the top or from the front of the eyeglass frame.

In addition to providing the eyewires of the frame with inlaid non-metallic portions such as enamel or the like I may also similarly inlay the bridge 38 by providing a recess therein in any of the forms suitable therefor as above described in connection with the eyewire.

It will be apparent that the metallic eyewire or bridge has an inlay of non-metallic material so as to have a two-tone appearance. Ophthalmic mountings of this improved construction may be made extremely durable and yet provide opportunity for a great variety of ornamental effects depending upon selection of color and of different non-metallic materials as is desired.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a metallic eyewire having a channel-shape groove extending along its outer surface, with undercut edges, and enamel in said groove with its outer surface substantially flush with the surface of said metallic eyewire on the general outer surface contour of the lens frame, said enamel extending beneath said undercut edges, whereby it is held in place.

2. In an ophthalmic mounting, a metallic eyewire having a channel shape groove extending along its outer surface, with undercut edges, and plastic material in said groove with its outer surface substantially flush with the surface of said metallic eyewire on the general outer surface contour of the lens frame, said plastic material extending beneath said undercut edges whereby it is held in place.

3. In an ophthalmic mounting, a metallic eyewire having a longitudinal groove in its outer surface with a high portion forming a rib intermediate its edges and non-metallic material in said groove at either side of said high portion leaving the high portion exposed and forming a stripe effect along the outer surface thereof.

4. In an ophthalmic mounting, a metallic eyewire having a longitudinal groove in its outer surface with a high portion forming a rib intermediate its edges and non-metallic material in said groove at either side of said high portion leaving the high portion exposed and forming a stripe effect along the outer surface thereof, the outer surface contour of said non-metallic material and high portion being substantially on the arc of a circle.

5. In an ophthalmic mounting, a metallic eyewire having a longitudinal groove in its outer surface with a high portion forming a rib intermediate its edges and enamel material in said groove at either side of said high portion leaving the high portion exposed and forming a stripe effect along the outer surface thereof.

EARLE J. R. BEATTEY.